(12) United States Patent
Teitel (10) Patent No.: US 9,388,968 B2
(45) Date of Patent: Jul. 12, 2016

(54) LIGHTING DEVICE AND METHOD OF MAKING A BICYCLE LIGHT WITH INCREASED VISIBILITY AND FLEXIBLE MOUNTING SYSTEM

(71) Applicant: Pedal Brite LLC, Scottsdale, AZ (US)

(72) Inventor: Lynn Teitel, Scottsdale, AZ (US)

(73) Assignee: Pedal Brite LLC, Scottsdale, AZ (US)

( * ) Notice: Subject to any disclaimer, the term of this patent is extended or adjusted under 35 U.S.C. 154(b) by 279 days.

(21) Appl. No.: 13/797,841

(22) Filed: Mar. 12, 2013

(65) Prior Publication Data

US 2014/0268687 A1 Sep. 18, 2014

(51) Int. Cl.
*F21S 8/00* (2006.01)
*F21V 17/00* (2006.01)
*B62J 6/02* (2006.01)

(52) U.S. Cl.
CPC . *F21V 17/00* (2013.01); *B62J 6/02* (2013.01); *Y10T 29/49826* (2015.01)

(58) Field of Classification Search
CPC ............ F21V 17/00; F21V 19/00; B62J 6/02; B62J 26/00; Y10T 29/49826
See application file for complete search history.

(56) References Cited

U.S. PATENT DOCUMENTS

2008/0123353 A1* 5/2008 Liu ............................... 362/375

* cited by examiner

*Primary Examiner* — Tracie Y Green
(74) *Attorney, Agent, or Firm* — Robert D. Atkins; Patent Law Group: Atkins and Associates, P.C.

(57) ABSTRACT

A light device includes a light engine. A plurality of petals extends radially outward from the light engine. A trim is disposed over the petals and light engine. An installation card is disposed between the trim and the petals and includes an elongated opening. A strap extends through the elongated opening of the installation card. A light-emitting diode is connected to the light engine. A support component is formed on a surface of the petals. The strap includes a hook surface and a loop surface opposite the hook surface. The installation card includes a second elongated opening formed near an edge of the installation card and a third opening formed in a central region of the installation card. A plurality of straps includes a width of the straps being less than a width of the elongated opening. The plurality of straps includes a zip tie.

25 Claims, 6 Drawing Sheets

LIGHTING DEVICE AND METHOD OF MAKING A BICYCLE LIGHT WITH INCREASED VISIBILITY AND FLEXIBLE MOUNTING SYSTEM

FIELD OF INVENTION

The disclosure relates generally to lighting products, and, specifically, to a bicycle lighting device with increased visibility and a flexible mounting system.

BACKGROUND OF THE INVENTION

People use bicycles as an inexpensive means of transportation. Bicycles enable a person to get from point A to point B under the power of the bicycle rider. Bicycles also provide a source of exercise and entertainment. Cyclists face safety issues whether riding for transportation, fun, or exercise. Riders are exposed on bicycles and usually ejected from the bicycle in an accident, leaving the cyclist vulnerable to resulting injuries. The only guaranteed way a cyclist can avoid injury resulting from an accident is to avoid accidents all together. Visibility is critical to avoiding accidents. People riding bicycles need to be able to see to ride safely and avoid objects in the path of the bicycle. Bicycle riders also need to be seen by other cyclists, pedestrians, and drivers so that other people can avoid hitting the riders.

As the sun sets, visibility declines for cyclists, pedestrians, and drivers alike increasing the chance that an obstacle or cyclist might go unseen. Lighting plays a critical role in bicycle safety after dusk. Cyclists, pedestrians, and drivers need assistance to see obstacles and other travelers on the road at night. Cyclists and pedestrians, in particular, need to be seen by drivers to prevent dangerous circumstances leading to accident and injury.

Many cyclists and pedestrians refuse to use existing lights. Some people see a bicycle as a form of expression and refuse to use ugly or boring lights for aesthetic reasons. Others refuse to use lights due to the expense and hassle of installation and removal of the bicycle light. Nobody wants to spend 10 minutes mounting a light for a 5 minute ride. These barriers preventing people from using lights on a bicycle impede the safe use of a bicycle for transportation and enjoyment by limiting the use of lights. A need exists for a bicycle light with improved ease of installation and aesthetics to increase light use by cyclists and improve bicycle safety.

Even when riders do use bicycle lights, existing lights for cyclists and pedestrians provide only a small lighted area for automobile drivers to see, usually the size of the bulb or light engine. The lights provide minimal visibility of cyclists to automobile drivers. The less visible a cyclist is to an automobile driver, the less likely a driver is to discern a pedestrian or cyclist when approaching in the dark. A need exists for a light that improves visibility of cyclists and pedestrians to nearby automobile drivers.

SUMMARY OF THE INVENTION

A need exists for a personal lighting device that is easy to install and remove with increased visibility. Accordingly, in one embodiment the present invention is a light device comprising a light engine. A plurality of petals extends radially outward from the light engine. A trim is disposed over the petals and light engine. An installation card is disposed between the trim and the petals and includes an elongated opening. A strap extends through the elongated opening of the installation card.

In another embodiment, the present invention is a light device comprising a light engine. A plurality of petals extends from the light engine. A trim is disposed over the petals and light engine. An installation card is disposed between the trim and the petals.

In another embodiment, the present invention is a light device comprising a light engine. A petal is disposed over the light engine. An installation card is disposed over the light engine and petal to mount to a bicycle.

In another embodiment, the present invention is a method of making a lighting device, comprising providing a lighting engine, disposing a petal over the lighting engine, and disposing an installation card over the petal.

DETAILED DESCRIPTION OF THE DRAWINGS

Aspects of one or more example embodiments are described in the following disclosure with reference to the Figures, in which like numerals represent the same or similar elements. While the described example embodiments include the best mode, it will be appreciated by those skilled in the art that it is intended to cover alternatives, modifications, and equivalents as may be included within the spirit and scope of the invention as set forth and defined by the appended claims and their equivalents as supported by the following disclosure and drawings.

Figure 1:
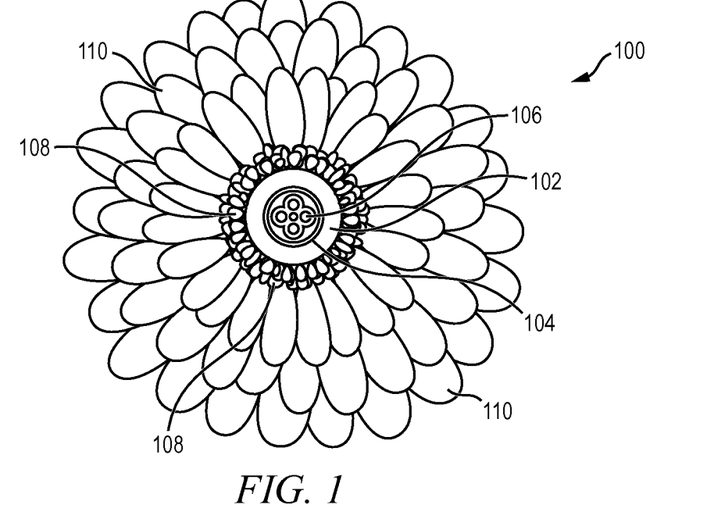
FIG. 1 illustrates a lighting device having increased visibility and improved ease of installation.

FIG. 1a illustrates a plan view of personal lighting device 100 in the shape of a flower. Lighting device 100 includes a light engine 102 in a central location of lighting device 100. Light engine 102 is round in shape, but other shapes such as triangular, square, elliptical, or polygonal are envisioned. Light engine 102 has a plastic casing but could also be metal, rubber, or other moldable material to provide support and protect light engine 102. The top surface of light engine 102 is covered by lens 104 in the center of light engine 102. Lens 104 is a translucent or transparent material shaped to optically focus or disperse light from light engine 102. Lens 104 is disposed over light emitting diodes (LEDs) 106 of light engine 102. Light engine 102 emits light and can be configured to use various colors, with white and red light being used when mounting the lighting device to the front or rear of a bicycle. Additional colors and combinations may be used to increase visibility or alter aesthetics of light device 100. Light engine 102 may provide flashing, intermittent, or constant light, depending on the selected light setting.

Light engine 102 is mounted in the center of stamens 108 and petals 110 of lighting device 100 so that stamens 108 and petals 110 surround a peripheral region of light engine 102. Light engine 102 occupies the central position where a pistil would be located in a flower. Alternatively, light engine 102 can emit light through LEDs disposed on the ends of stamens 108 or in between petals 110 to provide increased visibility. Petals 110 and stamens 108 can be made of cloth, rubber, plastic, metal, or any other material that provides structure for the trim and can be illuminated by light engine 102. Stamens 108 and petals 110 extend radially outward from light engine 102 to form a circular shape. Petals can range in number and orientation from a single, continuous petal 110 that surrounds or partially surrounds light engine 102 to multiple petals 110 that surround or partially surround light engine 102. Petals 110 and stamens 108 provide additional surface area for illumination by and reflection of light generated by light engine 102 to increase visibility of lighting device 100 by providing a large, lighted surface area on lighting device 100. A continuous, solid trim can also surround light engine 102 using a single petal to provide additional surface area for illumination. In one embodiment, petals 110 or stamens 108 are made from a reflective material so that light from sources other than light engine 102 is reflected to increase visibility of lighting device 100.

Light engine 102 is illustrated in FIG. 1 having an LED light source. Other light sources can be used in place of LEDs 106 including florescent, halogen, or filament light bulbs. Light engine 102 can include a single light source, or multiple light sources such as the four LEDs shown in FIG. 1. LEDs 106 emit light that shines through lens 104 and illuminates the surroundings, such as a road or sidewalk to increase visibility of obstacles and hazards for the user. LEDs 106 also illuminate petals 110 or stamens 108 and provide a lit surface to increase visibility of the lighting device to other cyclists and drivers.

Figure 2:
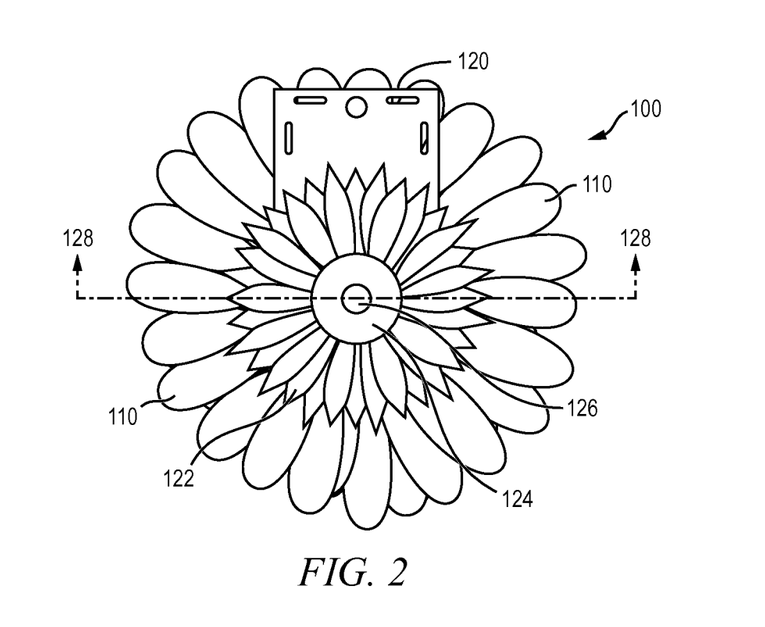
FIG. 2 illustrates a lighting device having increased visibility and improved ease of installation.

FIG. 2 illustrates the rear of lighting device 100. Personal lighting device 100 includes installation card 120 mounted between trim 122 and petals 110 to provide a mounting surface for personal lighting device 100. The exterior portion of trim 122 is shaped like the leaves beneath a flower, or a sepal. Alternatively, trim 122 can include a flat surface to provide an improved mounting surface. In one embodiment, installation card 120 is substituted for trim 122. Installation card 120 is made of plastic, rubber, metal, or other materials to provide structural support for openings resulting in ease of installation. Trim 122 includes surface 124 formed in a bell shape. Trim 122 and surface 124 are made from plastic, rubber, metal, or other moldable materials. Surface 124 has a flat central area to provide a mating surface for cap 126. Cap 126 is a nut for use with a screw with threading on the inside surface to accept a screw and fasten the components of lighting device 100 together. Cap 126 is made of metal or a similarly rigid material to provide strength when holding a screw and to press against trim 122. Cap 126 can be plastic or metallic and holds a screw passing through the center of lighting device 100.

Figure 3:
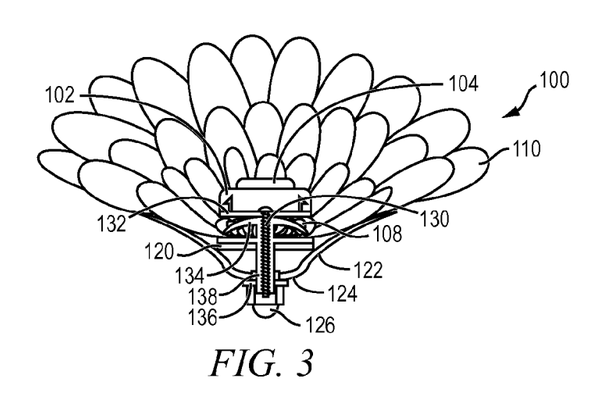
FIG. 3 illustrates a cross section of a lighting device having improved visibility and ease of installation.

FIG. 3 illustrates a cross section of lighting device 100 along line 128. Cap or nut 126 receives screw 130 to fasten components of lighting device 100 together. Screw 130 is inserted through base 132 of light engine 102 with the head of screw 130 pressing against base 132. Light engine 102 is affixed to base 132 using tabs of base 132 inserted into slots in light engine 102 designed to mate with tabs. After tabs of base 132 are inserted into light engine 102, light engine 102 is twisted relative to base 132 to lock light engine 102 in place relative to base 132. Screw 130 extends through base 132, flange 134, installation card 120, trim 122, washer 136, tube 138, and into cap 126 pressing adjacent components together. Screw 130 is twisted into cap 126 to secure components between cap 126 and head of screw 130. Base 132 is pressed into flange 134 by screw 130 and can also be attached to flange 134 by an adhesive, as can any adjacent components of lighting device 100. Flange 134 extends downward with a stem portion or tube 138 extending away from flange 134 opposite base 132 and provides a path for screw 130 to extend to cap 126.

Figure 4:
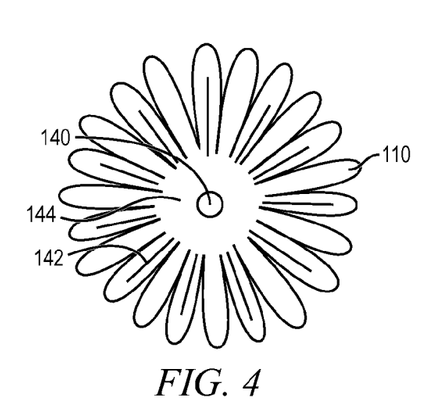
FIG. 4 illustrates petals of a lighting device cut from a piece of cloth.

FIG. 4 illustrates petals 110 cut from a piece of cloth with opening 140 and support component 142 formed along a back surface of petal 110. Multiple petals 110 or stamens 108 can be cut from a single piece of cloth with an open center 140 so that petals 110 are connected. For example, petals 110 are cut from a piece of cloth with petals 110 meeting at a base portion 144 of the cloth to form a ring with an opening 140 at the center. The open center of the ring allows light engine 102, tube 138, screw 130, or other components of lighting device 100 to pass through opening 140 of petals 110. Stamens 108 cover the base portion of the ring of petals 110 once installed in lighting device 100 so that each petal 110 appears to be an individual petal, as shown in FIGS. 1 and 3.

Figure 5:
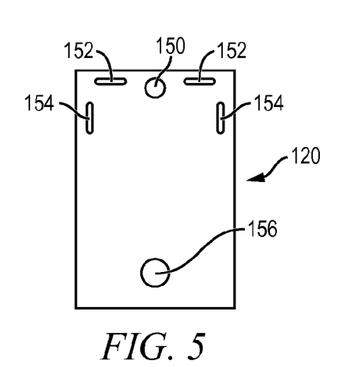
FIG. 5 illustrates an installation card used to mount a lighting device with improved ease of installation.

FIG. 5 illustrates installation card 120 in greater detail. Installation card 120 has a width of 7.6 centimeters (cm) or 3 inches and a height of 10.8 cm or 4.25 inches. Card 120 is approximately 1 millimeter (mm) thick. Openings 150, 152, and 156 are formed through card 120. Opening 150 is shown as being round with a diameter of approximately 7 mm with various opening sizes possible. Opening 150 formed in a central region of installation card 120 allows a mounting device, such as a nail, screw, hook, strap, zip tie, or string, to pass through and fix installation card 120 to another object. Opening 152 has an elongated shape parallel to the shorter edge of installation card 120, with a height of approximately 3 mm and a flat segment with a length of approximately 13 mm. The rounded portion of opening 152 on either end of the flat segment is circular with a diameter equal to the height of the adjacent flat segment. The elongated shape of opening 152 is configured to allow a fixing mechanism such as a string, strap, or zip tie to fit through opening 152 and maintain a stable fit.

Opening 154 has an elongated shape, with the elongated side being parallel to the longer edge of installation card 120. Opening 154 has a height of approximately 3 mm while the elongated, flat segment has a length of approximately 13 mm. The rounded portion of opening 154 on either end of the flat segment is circular with a diameter equal to the height of the adjacent flat segment. The elongated shape of opening 154 is configured to allow a fixing mechanism such as a string, strap, or zip tie to fit through opening 154 and maintain a stable fit. Opening 156 is shown as being round with a diameter of approximately 13 mm with various opening sizes possible. Opening 156 allows tube 138 and screw 130 to pass through opening 156 and fix installation card 120 to lighting device 100. Installation card 120 provides multiple mounting options to increase ease of installation of lighting device 100.

Figure 6A:
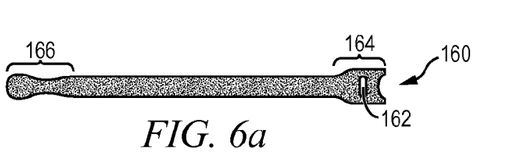
FIGS. 6a-6c illustrate a strap for use with the installation card used to mount a lighting device with improved ease of installation.

FIG. 6a illustrates strap 160 for fastening lighting device 100 to a bicycle or other object using installation card 120. Strap 160 has a width less than the length of openings 152 or 154 so that strap 160 can pass through opening 152 and 154. Strap 160 is approximately 20 cm long and 1.3 cm wide, corresponding to the 1.3 cm length of the flat segment of openings 152 and 154. Strap 160 has opening 162 formed in tail portion 164. Tail portion 164 is approximately 2 cm wide at the widest point. Opening 162 of tail portion 164 is approximately 1.3 cm long and 3 mm wide to allow head portion 166 to pass through opening 162. Head portion 166 is approximately 10 mm across the widest point and 7 mm across at the narrowest point.

Figure 6B:
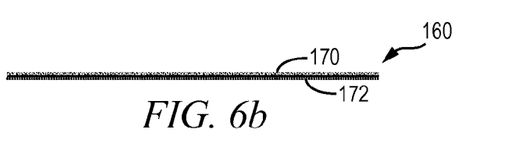

In FIG. 6a, Strap 160 uses a hook and loop fastener such as Velcro® to form a loop for ease of installation and removal of lighting device 100. Other fasteners could also function equally well, such as snaps, belt-style hook and holes, zip ties, string, rope, or button closures, for example. FIG. 6b shows a front view of strap 160. Upper surface 170 includes cloth loops over the length of strap 160. The cloth loops are configured to receive hooks from lower surface 172. When hooks from lower surface 172 are pressed against the cloth loops of surface 170, the two sides provide adhesion to hold surfaces 170 and 172 of strap 160 together.

Figure 6C:
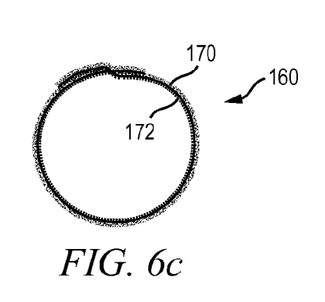

FIG. 6c shows strap 160 bent into a circle with surface 170 facing outward and surface 172 facing inward. The strap also works if the surfaces are reversed with surface 170 facing inward and surface 172 facing outward. Head portion 166 is inserted through slot or opening 162 of tail portion 164 from FIG. 6a. The desired length of strap 160 is pulled through opening 162 of tail portion 164 to adjust the diameter of the circular shape formed by strap 160. As more length of strap 160 is pulled through opening 162, the diameter of the circle gets smaller. Surface 172 of head portion 166 and the length of strap 160 pulled through opening 162 is pressed against surface 170 of strap 160 adjacent to opening 162 and extending away from tail portion 164. Surface 170 of strap 160 presses against surface 172 of tail portion 164 between opening 162 and the tip of tail portion 164. The contact between surfaces 170 and 172 provides adhesion for fast and easy installation and removal of installation card 120 and lighting device 100.

Figure 7A:
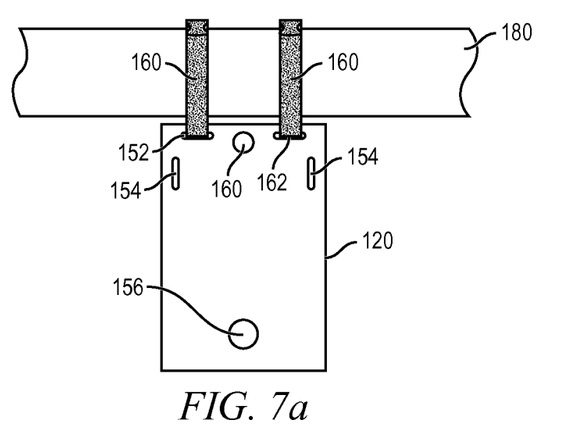
FIGS. 7a-7c illustrate an installation card attached to a horizontal bar using straps to mount a lighting device.

In FIG. 7a, installation card 120 is mounted to bar 180 using straps 160. Straps 160 pass through opening 152 at the top of card 120 and around horizontal bar 180. Strap 160 has head portion 166 pulled through opening 162 of tail portion 164 until strap 160 is snug around bar 180. Installation card 120 hangs below bar 180 with openings 154 and 150 unoccupied. Lighting device 100 is omitted from FIG. 7a to illustrate the configuration of card 120. The round shape of opening 156 allows tube 138 and screw 130 to pass through opening 156 and attach installation card 120 to lighting device 100. Installation card 120 provides multiple mounting options to increase ease of installation and removal of lighting device 100.

Figure 7B:
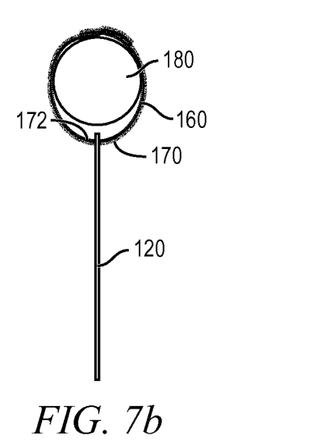

FIG. 7b shows a cross section of installation card 120 and bar 180. Bar 180 is depicted as round, although straps 160 attach to any shape of bar given the flexibility of strap 160. Strap 160 passes through installation card 120 at opening 152 and follows a contour of bar 180 to form a closed loop around the bar. Strap 160 has head portion 166 pulled through opening 162 of tail portion 164 until strap 160 is snug around bar 180. Surfaces 172 and 170 are pressed together to provide adhesion and maintain the loop formed by strap 160 around bar 180. Other types of straps can be used in place of hook and loop strap 160, such as straps using snaps, belt-style hook and holes, zip ties, string, rope, or button closures, for example. Installation card 120 hangs below bar 180 with openings 154 and 150 unoccupied. Card 120 supports lighting device 100 and provides multiple mounting options to increase ease of installation and removal of lighting device 100.

Figure 7C:
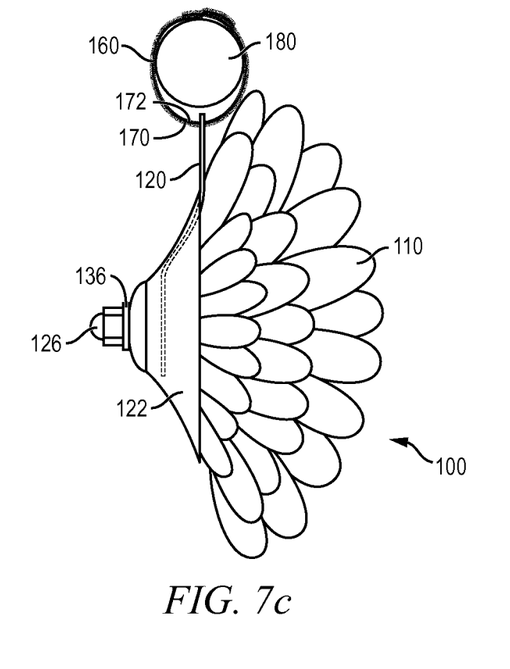

FIG. 7c illustrates lighting device 100 mounted to horizontal bar 180 using installation card 120. Strap 160 passes through installation card 120 and follows a contour of bar 180 to form a closed loop. Installation card 120 is integrated into lighting device and is pressed between petals 110 and trim 122. Card 120 has petals 110, stamens 108, light engine 102, and the head of screw 130 on one side of the card while trim 122, washer 136, and cap 126 are on the opposite side of the card. Tube 138 and screw 130 pass through opening 156 of card 120 and hold card 120 in place on light device 100. Installation card 120 provides a fast and easy method of installing lighting device 100 on horizontal bar 180.

Figure 8A:
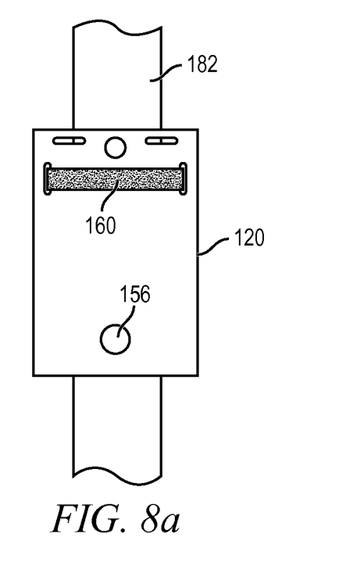
FIGS. 8a-8c illustrate an installation card attached to a vertical bar using straps to mount a lighting device.
Figure 8B:
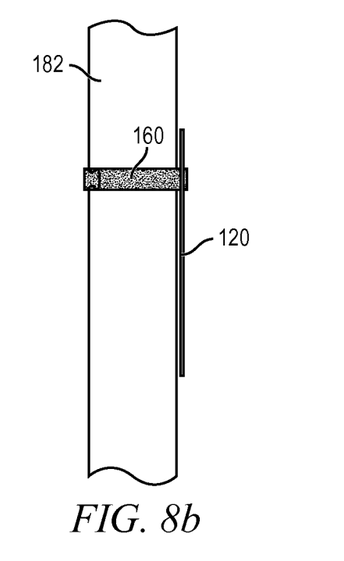
Figure 8C:
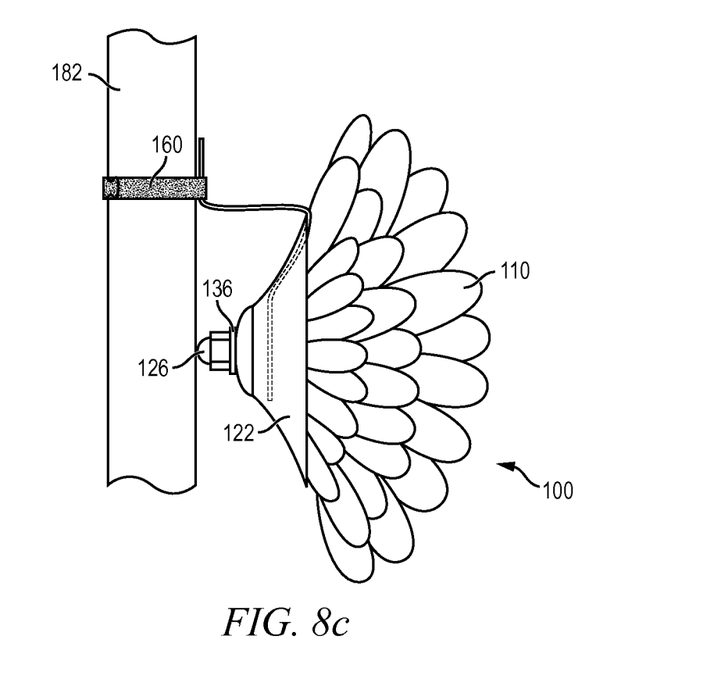

FIGS. 8a-8c show installation card 120 attached to a vertical bar 182 to mount lighting device 100. In FIG. 8a, strap 160 passes through openings 154 along the side edges of installation card 120 and around vertical bar 182. Strap 160 has head portion 166 pulled through opening 162 of tail portion 164 until strap 160 is snug around bar 180. Strap 160 is pulled tight to provide enough support to prevent installation card 120 from sliding down bar 182. Other types of straps 160 can be used in place of the hook and loop strap, such as straps using snaps, belt-style hook and holes, zip ties, string, rope, or button closures, for example. FIG. 8b illustrates installation card 120 attached to vertical bar 182 without lighting device 100. Installation card is parallel to bar 182 when no pressure is applied to bend installation card 120. In one embodiment, lighting device 100 has little depth behind installation card 120 so that installation card 120 can remain substantially parallel to bar 182 while lighting device 100 is mounted.

FIG. 8c illustrates installation card 120 attaching lighting device 100 to vertical bar 182. Installation card 120 is flexible so that the portion of card 120 with opening 156 can move away from bar 182 while strap 160 holds the portion of card 120 near openings 154 close to or against bar 182. When lighting device 100 is mounted to vertical bar 182 using installation card 120, the flexibility of card 120 increases the pressure exerted by strap 160 against bar 182 and increases tension in strap 160. Trim 122 extends between installation card 120 and bar 182, bending installation card 120 away from bar 182 to create space for lighting device 100. Lighting device 100 is mounted by card 120. The round shape of opening 156 allows tube 138 and screw 130 to pass through opening 156 and fix installation card 120 to lighting device 100. Installation card 120 can be bent to varying degrees to mount lighting device 100 so that light engine 102 is at various angles to bar 182. Installation card 120 provides multiple mounting options to increase ease of installation and removal of lighting device 100.

Figure 9A:
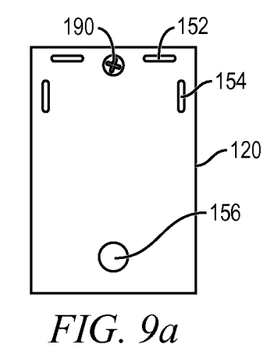
FIGS. 9a-9c illustrate the installation card mounted to a flat surface using a screw or hook to mount a lighting device.
Figure 9B:
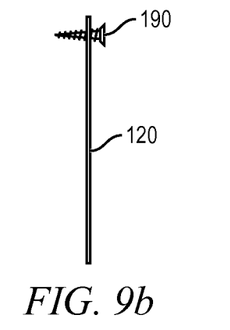
Figure 9C:
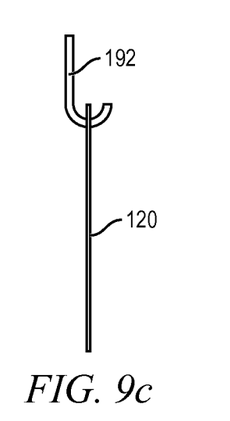

FIGS. 9a-9c illustrate alternative methods of mounting installation card 120 and lighting device 100. Card 120 includes opening 150 in a central area of the top side of card 120, between openings 152. Opening 150 has a round shape, although other opening shapes are also effective. Opening 150 provides space to fix card 120 to a surface. In FIGS. 9a and 9b, screw 190 is inserted through opening 150 and screwed into a mounting surface, such as bar 180, bar 182, wood, drywall, a rack, or any other surface capable of receiving a screw. Screw 190 can have a head portion that is larger than opening 150, so that screw 190 must be removed in order to remove installation card 120 and lighting device 100. Screw 190 can also have a head portion slightly smaller than opening 150, so that card 120 can be easily removed and installed without removing screw 190. Other fasteners such as nails and hooks are also effective in mounting card 120 through opening 150. For example, FIG. 9c shows hook 192 passed through opening 150 to mount installation card 120. Hook 192 allows installation card 120 to swing freely to make room for lighting device 100 when hook 192 is close to a wall, bar, or other surface. Hook 192 and installation card 120 provide increased ease of installation and removal of lighting device 100.

Figure 10:
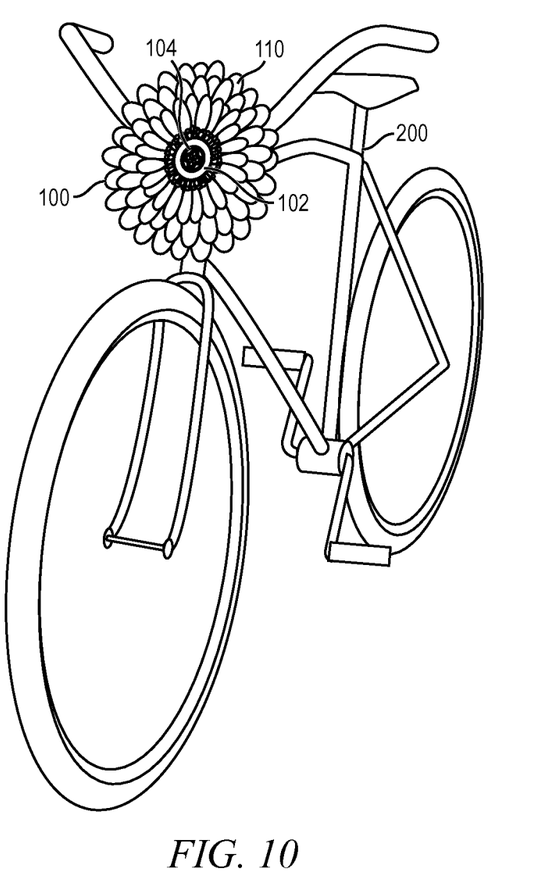
FIG. 10 illustrates a personal lighting device mounted to a bicycle.

FIG. 10 illustrates lighting device 100 mounted to bicycle 200. Light engine 102 and lens 104 face forward to provide the rider with visibility and enable other traffic to see the rider. Petals 110 extend radially outward from light engine 102 and forward beyond the level of lens 104. Light engine 102 illuminates petals 110 to increase the visibility of bicycle 200 to drivers, pedestrians, and other bicyclists. Straps 160 are behind lighting device 100 and attach to installation card 120 to affix lighting device 100 to bicycle 200.

Lighting device 100 provides increased safety for bicycle riders and other traffic by increasing illuminated surface area of lighting device 100 to increase visibility of the rider to other drivers and cyclists. Lighting device 100 provides an aesthetically enticing light mechanism to encourage cyclists to use a light. Thus, lighting device 100 increases bicycle safety by increasing light usage by cyclists. Additionally, installation card 120 increases ease of installation and removal of lighting device 100 by providing a fast and simple mechanism to attach lighting device 100 to a bicycle. Multiple openings on installation card 120 enable users to quickly mount lighting device 100 on a variety of bars, racks, walls, or other surfaces to improve ease of installation and removal.

While one or more embodiments of the present invention have been illustrated in detail, the skilled artisan will appreciate that modifications and adaptations to those embodiments may be made without departing from the scope of the present invention as set forth in the following claims.

What is claimed:

1. A light device, comprising:
   a light engine;
   a plurality of petals extending radially outward from the light engine;
   a trim disposed over the petals and light engine and including an opening aligned with an opening in the petals;
   an installation card disposed between the trim and the petals and including a first opening aligned with the opening in the trim; and
   a mounting device including a strap extending through a second opening of the installation card for mounting the light device to a bicycle.

2. The light device of claim 1, further including a light-emitting diode connected to the light engine.

3. The light device of claim 1, further including a support component formed on a surface of the petals.

4. The light device of claim 1, wherein the strap includes a hook surface and a loop surface opposite the hook surface.

5. The light device of claim 1, further including:
   a cap disposed over the trim; and
   a fastening device extending from the light engine through the petals, installation card, and trim and into the cap.

6. A light device, comprising:
   a light engine;
   a plurality of petals extending from the light engine;
   a trim disposed over the petals and light engine; and
   an installation component disposed between the trim and the petals and including a first opening aligned with an opening in the petals with the installation component configured for mounting the light device.

7. The light device of claim 6, wherein the installation component includes a polymer material.

8. The light device of claim 6, further including a plurality of straps for mounting the light device extending from the installation component with a width of the straps being less than a width of a second opening in the installation component.

9. The light device of claim 8, wherein the plurality of straps includes a first strap with a hook surface and a loop surface opposite the hook surface.

10. The light device of claim 8, wherein the plurality of straps includes a zip tie.

11. The light device of claim 6, further including a support component formed over a surface of the petals.

12. The light device of claim 6, further including a light-emitting diode connected to the light engine.

13. The light device of claim 6, further including a fastening device extending from the light engine through the petals and installation component.

14. A light device, comprising:
    a light engine;
    a petal disposed over the light engine;
    an installation component disposed over the light engine and petal with the installation component configured for mounting the light device;
    a cap disposed over the installation component; and
    a fastening device extending from the light engine through the petal and installation component and into the cap.

15. The light device of claim 14, further including a trim disposed over the petal and light engine with the installation component disposed between the trim and petal.

16. The light device of claim 15, wherein an opening in the trim is aligned with an opening in the installation component.

17. The light device of claim 14, further including a strap extending from the installation component.

18. The light device of claim 17, wherein the installation component includes a plurality of elongated openings comprising a width greater than a width of the strap.

19. The light device of claim 14, wherein the installation component includes a polymer material.

20. The light device of claim 14, wherein the fastening device includes a screw.

21. A method of making a light device, comprising:
    providing a light engine;
    providing a shaft extending from the light engine;
    disposing a petal over the light engine with the shaft extending through the petal; and
    disposing an installation component over the petal with the shaft extending through the installation component.

22. The method of claim 21, further including disposing a cap over the installation component with the shaft extending into the cap.

23. The method of claim 21, further including providing a strap extending from the installation component.

24. The method of claim 21, wherein an opening in the installation component is aligned with an opening in the petal.

25. The method of claim 21, wherein the petal extends radially outward from the light engine.

* * * * *